United States Patent [19]

van den Enden et al.

[11] 4,319,092

[45] Mar. 9, 1982

[54] CURRENT DETECTION CIRCUIT ARRANGEMENT FOR AN AUTOMATIC TELEPHONE EXCHANGE

[75] Inventors: Adrianus W. M. van den Enden; Job F. P. van Mil, both of Eindhoven, Netherlands

[73] Assignee: U.S. Philips Corporation, New York, N.Y.

[21] Appl. No.: 149,781

[22] Filed: May 14, 1980

[30] Foreign Application Priority Data

Jun. 6, 1979 [NL] Netherlands ..................... 7904429

[51] Int. Cl.³ ............................................. H04M 3/02
[52] U.S. Cl. ................................................ 179/18 FA
[58] Field of Search ........... 179/18 F, 18 FA, 18 HB, 179/81 R, 84 R, 16 F

[56] References Cited
U.S. PATENT DOCUMENTS 4,099,032   7/1978   Roge et al. ..................... 179/18 HB Primary Examiner—Thomas A. Robinson
Attorney, Agent, or Firm—Thomas A. Briody; William J. Streeter; Laurence A. Wright

[57] ABSTRACT

Current detection circuit arrangement for an automatic telephone exchange for detecting currents in a system of two conductors having earth as the common return conductor. This circuit arrangement comprises a pair of measuring resistors $R_1$, $R'_1$ and a pair of voltage dividers $R_2$, $R_5$ and $R_3$, $R_4$ which are connected cross-wise and form a bridge. The loop current $I_d$ can be detected with this circuit arrangement. It is also desirable for the circuit arrangement to enable the detection of the longitudinal currents in the conductors. The present circuit arrangement comprises a pair of connecting points for a detector for the longitudinal currents, one point of which is connected to the tapping point of one and to the tapping point of the other voltage divider, respectively, by way of separate resistors, the other point being a point of reference potential.

5 Claims, 5 Drawing Figures

CURRENT DETECTION CIRCUIT ARRANGEMENT FOR AN AUTOMATIC TELEPHONE EXCHANGE

The invention relates to a circuit arrangement for an automatic telephone exchange for detecting currents in a system of two conductors having earth as the common return conductor.

BACKGROUND OF THE INVENTION

Such an arrangement is known from the German Auslegeschrift No. DE-B 1,293,873.

These circuit arrangements are used to detect the loop condition of subscriber's lines.

In some private telephone systems (PABX) so-called earthing buttons are used to enable earth return signalling from the subscriber's set to the telephone exchange during the call condition. By pressing the earthing button of the telephone set, the a-wire of the subscriber's line is connected to earth. This signal can be detected in the telephone exchange by a detection circuit connected to the supply circuit of the b-wire, as described in the German Offenlegungsschrift No. DE-A 2,547,880. This detection method has the drawback that the detection circuit for the earth button-signalling is also responsive to the interruption of the subscriber's loop.

It is an object of the invention to extend a circuit arrangement of the afore-mentioned type in a similar way, thus enabling the detection of the common-mode component of the currents in the two conductors. In practice, this may inter alia be used for detecting the earth button-signalling. The advantage is obtained that no confusion will occur with the interruption of the subscriber's loop, so that this detection of the earthing button-signalling is unambiguous.

SUMMARY OF THE INVENTION

The circuit arrangement according to the invention is characterized in that for the detection of the common-mode component of the currents in the two conductors means are provided for forming the sum of the voltages at the said junctions of the first and the second pair of resistors, respectively, and means are provided for comparing the said sum of the voltages with the potential at a point of reference potential, an indication of the common-mode component of the currents in the two conductors being derived from the last-mentioned means.

BRIEF DESCRIPTION OF THE DRAWINGS

The invention and its advantages will be further explained with reference to the drawings wherein.

DESCRIPTION OF THE PREFERRED EMBODIMENTS

Figure 1:
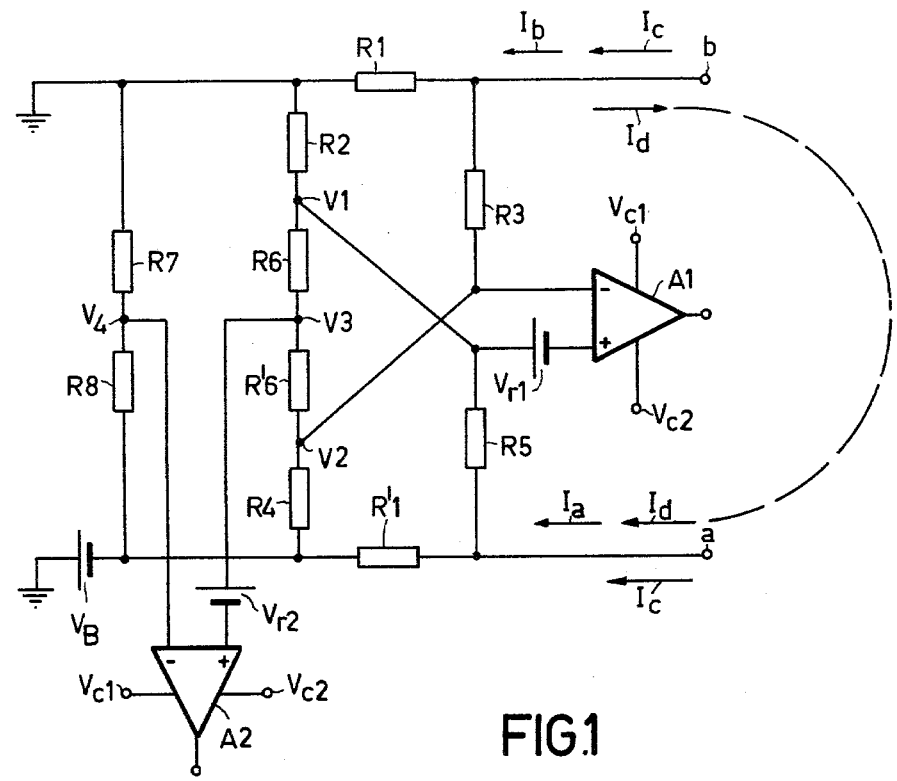
FIG. 1 is the circuit diagram of a detection circuit according to the invention.

The detection circuit of FIG. 1 has terminals a and b for the respective connection of the a- and b-wires of a subscriber's line. A low-ohmic measuring resistor $R'_1$ is arranged between the a-terminal and the negative pole of a supply battery having the voltage $V_B$, whose positive terminal is connected to earth. Likewise, a low-ohmic measuring resistor $R_1 = R'_1$ is arranged between the b-terminal and earth. The resistors $R_1$ and $R'_1$ are constituted by or form part of the customary supply resistors of the subscriber's line. A voltage divider consisting of resistors $R_3$ and $R_4$ is arranged between the b-terminal and the negative pole of the supply battery. Likewise, a voltage divider consisting of resistors $R_2$ and $R_5$ is arranged between the a-terminal and earth. In order to prevent unnecessary losses from occurring in the detection circuit, the resistors $R_2$, $R_3$, $R_4$ and $R_5$ must have a high impedance relative to $R_1$ and $R'_1$. However, this is not essential to the operation of the detection circuit.

The voltage at the node of the resistors $R_2$ and $R_5$, and $R_3$ and $R_4$ is denoted by $V_1$ and $V_2$ respectively.

The currents $I_a$ and $I_b$ flowing in the wires of the subscriber's line may be defined as:

$$I_a = I_c + I_d \tag{1}$$

$$I_b = I_c - I_d$$

wherein $I_d$ represents the loop current, also referred to as the differential-mode component, and wherein $I_c$ represents the longitudinal current, also referred to as the common-mode component.

The voltage $V_1 - V_2$ depends linearly on $V_B$, $I_d$ and $I_c$, it being possible to demonstrate that the voltage $V_1 - V_2$ is independent of the longitudinal currents $I_c$, when the condition:

$$\frac{R_2}{R_1 + R_2 + R_5} = \frac{R_4}{R_1 + R_3 + R_4} \tag{2}$$

is satisfied.

Further, it can be demonstrated that the voltage $V_1 - V_2$ only depends on the loop current $I_d$, when not only condition (2) is satisfied, but also the condition that:

$$R_3 = R_4 \tag{3}$$

The voltage $V_1 - V_2$ can be used to obtain information about the state of the subscriber's line and, possibly, to tap off the speech signal from the subscriber's line without interference by longitudinal currents.

To detect the loop current $I_d$, the voltages $V_1$ and $V_2$ are applied to the differential input of a differential amplifier $A_1$. This differential amplifier may be constructed as a linear amplifier; in which case the subscriber's speech signals can be derived from the output of the amplifier.

When the conditions (2) and (3) are satisfied, the output signal of the linear amplifier is independent of the battery voltage $V_B$ so that noise and cross-talk by way of the battery is suppressed.

It is usually desirable to have available, in the telephone exchange a binary indication of the condition (open or closed) of the subscriber's loop. This indication can, for example, be obtained when the differential amplifier $A_1$ is constructed as a voltage comparator having a two-level output signal which depends on the polarity of the input signal. When the conditions (2) and (3) are satisfied, the condition of the voltage comparator changes at $I_d = 0$. It is possible to obtain a change in condition at a different value of $I_d$ by including a reference voltage source $V_{r1}$ in a signal supply lead to the differential amplifier $A_1$.

When the reference voltage $V_{r1}$ has a value of zero Volt and condition (3) is not satisfied, the state of the voltage comparator changes at a predetermined value of the line resistance $R_L$:

$$R_L = \frac{2R_1R_3}{R_4 - R_3} \quad (4)$$

wherein $R_L = R_T + 2R_K$, wherein $R_T$ represents the impedance of the telephone set and $R_K$ the resistance of one wire of the subscriber's line.

By making the reference voltage $V_{r1}$ unequal to 0 Volt and by not satisfying condition (3), the loop current at which the state of the voltage comparator changes is given by the superposition of a constant current and a current which is proportional to the battery voltage $V_B$. The detection criterium is then the parallel arrangement of a certain current source, carrying the constant current and a certain resistor, carrying the current which is proportional to the battery current $V_B$.

There are circumstances in which it is desirable to detect certain signalling signals which flow outside the subscriber's loop. This is, for example, the case for earth button-signalling in certain types of telephone exchanges. The a-wire of the subscriber's line can be connected to earth by means of an earthing button. For the subscriber this is a means with which he/she can indicate that a call-back connection is desired. In a known system the b-terminal of the arrangement shown in FIG. 1 is connected to a detector for the earth button-signalling. It will be clear that the voltage is removed from the b-terminal when the a-wire is connected to earth. However, this is also the case if the subscriber's line is interrupted. So the disappearance of the voltage from the b-terminal is not an unambiguous indication that the earthing button has been operated.

A better criterium is formed by the occurrence of a common-mode component $I_c$. To detect the common-mode component, use is made of the same voltages $V_1$ and $V_2$ which were used to detect the loop current.

Two resistors $R_6$ and $R'_6$ are arranged in series betweenn the points at which the voltages $V_1$ and $V_2$ occur. The voltage at the node of the resistors $R_6$ and $R'_6$ is denoted by $V_3$. In addition, a voltage divider, consisting of the resistors $R_7$ and $R_8$ is arranged between earth and the negative pole of the supply battery. The voltage at the node of the resistors $R_7$ and $R_8$, which serves as the reference for $V_3$, is denoted by $V_4$.

The voltage difference $V_3 - V_4$ depends linearly on $V_B$, $I_c$ and $I_d$, it being possible to demonstrate that $V_3 - V_4$ is independent of the loop current $I_d$, when condition (2) is satisfied and:

$$\frac{R_4(R_3 - R_5)}{R_1 + R_3 + R_4} = R_6 - R'_6 \quad (5)$$

It can further be demonstrated that the voltage $V_3 - V_4$ is only dependent of the longitudinal current $I_c$ when not only the conditions (2) and (5) are satisfied but also the condition that:

$$R_7 = R_8 \quad (6)$$

The voltage $V_3 - V_4$ can be used to obtain information about the common-mode component, for example for the detection of the earth button-signalling.

The voltages $V_3$ and $V_4$ are applied to the differential input of a differential amplifier $A_2$, which may be constructed as a linear amplifier, it then being possible, to derive any analogue information present in the longitudinal current at the output of the amplifier. When the conditions (2) and (5) are satisfied, the output signal of the amplifier is independent of the battery voltage $V_B$, so that noise and cross-talk by way of the battery are suppressed.

A binary indication of the state of the earth circuit, that is to say the circuit in which the longitudinal currents flow, can be obtained by constructing the differential amplifier $A_2$ as a voltage comparator. When the conditions (2) and (5) are satisfied, the state of the voltage comparator changes at $I_c = 0$. Changing the state at a value different from $I_c$ can be accomplished by including a reference voltage source $V_{r2}$ in a signal supply lead to differential amplifier $A_2$.

When the reference voltage $V_{r2}$ is zero Volt and when condition (6) is not satisfied, the state of the voltage comparator changes at a predetermined combination of the resistance to earth $R_a$, the set impedance $R_T$ and the resistance $R_K$ of a subscriber's line wire:

$$R_A = \frac{R_1 + R_T + R_K}{2R_1 + R_T + 2R_K} \left( \frac{R_1 R_4}{R_3 + R_4} \cdot \frac{R_7 + R_8}{R_8 - R_7} - R_1 - R_K \right) \quad (7)$$

Figure 2:
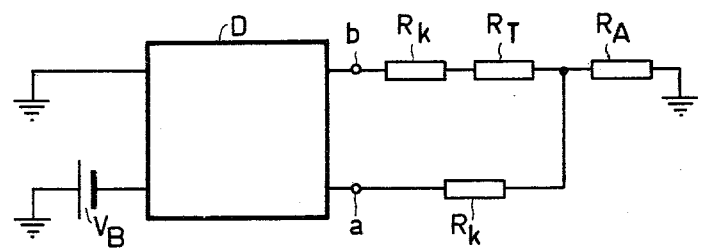
FIG. 2 is the equivalent circuit for earth button-signalling.

The equivalent circuit diagram of the subscriber's line and the telephone set connected thereto in the event of earth button-signalling is shown in FIG. 2. Herein the block D represents the detection circuit of FIG. 1.

By making the reference voltage $V_{r2}$ unequal to zero Volt and by not satisfying condition (6), the longitudinal current at which the state of the voltage comparator changes is given by the superposition of a constant current and a current which is proportional to the battery voltage.

A similar effect as obtained with the reference voltage sources $V_{r1}$ and $V_{r2}$ can be obtained by including voltage or current sources in the resistance network. The branches in which the high-impedance resistors are included are suitable places for these sources.

Figure 3:
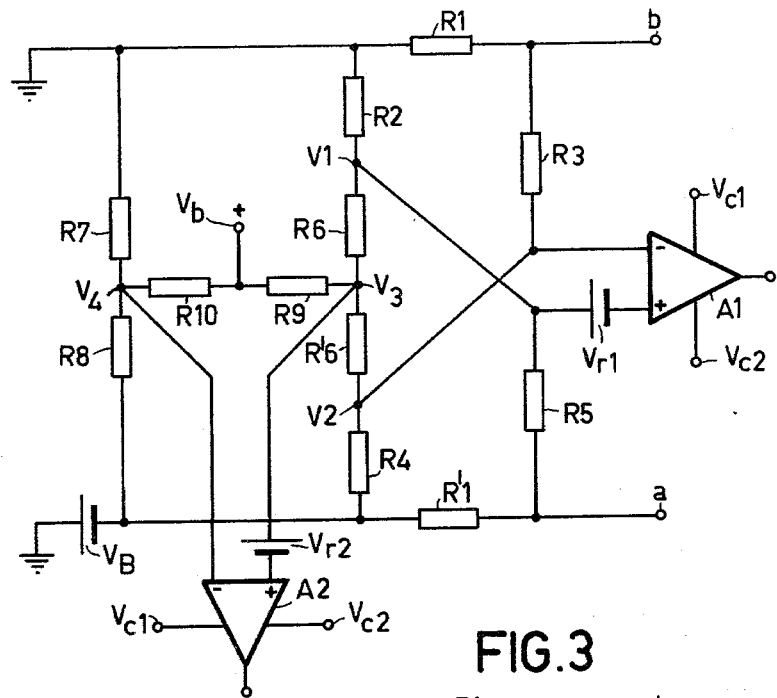
FIGS. 3 and 4, respectively, show the circuit diagrams of a first and a second extension, respectively, of the circuit shown in FIG. 1 for the realization of a level shift.

In view of the construction of the amplifiers $A_1$ and $A_2$, which operate between the supply voltages $V_{c1}$ and $V_{c2}$ it may be desirable to shift the level of the voltages $V_1$, $V_2$, $V_3$ and $V_4$ in the positive direction. This is possible by the use of a positive bias voltage $V_b$ whose supply terminal is connected by way of resistors $R_9$ and $R_{10}$ to the points where the voltages $V_3$ and $V_4$ occur, as is shown in FIG. 3.

Figure 4:
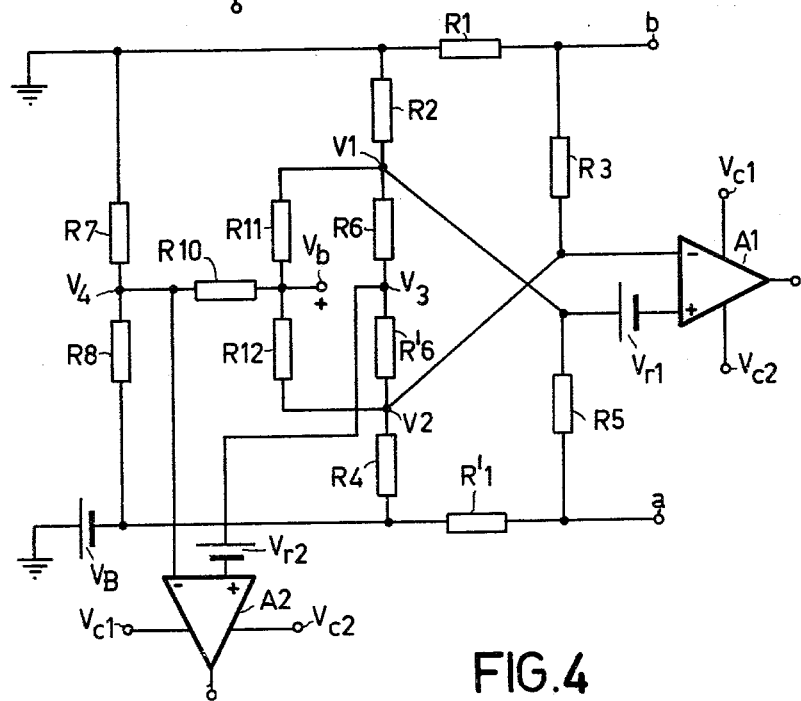

FIG. 4 shows an alternative construction in which the supply terminal for the bias voltage $V_b$ is connected to the point where the voltage $V_1$ ($V_2$) occurs by way of the resistor $R_{11}$ ($R_{12}$).

A suitable choice of the resistance values will ensure that the voltage $V_3 - V_4$ is independent of $V_b$.

The following data are given to illustrate the dimensioning of a detection circuit shown in FIG. 4 and suitable for practical uses:

$V_B = -48$ V, $V_b = +5$ V, $V_{r1} = V_{r2} = 0$ V.
$V_{c1} = 0$ V, $V_{c2} = +5$ V.
$R_1 = R'_1 = 173$ Ohms.
$R_2 = R_4 = R_8 = 100$ K Ohms $R_3 = R_5 = 86852$ Ohms
$R_{11} = R_{12} = 5672$ Ohms
$R_{10} = 5742$ Ohms
$R_7 = 89069$ Ohms
$R_6 = R'_6 = 40$ K Ohms.

The following equations hold for this example:

$$V_1 - V_2 = -0.321 + 17.83 \, I_d \tag{8}$$

$$V_3 - V_4 = -0.151 + 10.07 \, I_c$$

From the equations (8) it can be derived that the polarity of the voltage $V_1 - V_2$ changes at $I_d = 18$ mA and that the polarity of the voltage $V_3 - V_4$ changes at $I_c = 15$ mA.

Figure 5:
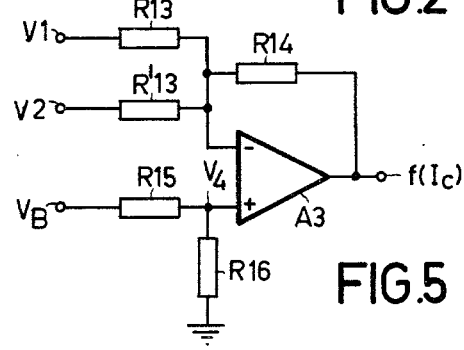
FIG. 5 is the circuit diagram of an adder circuit.

In the detection circuits described so far, the resistors $R_6$ and $R'_6$ are used to obtain a voltage $V_3$ which is the (weighted) sum of the voltage $V_1$ and $V_2$. This voltage $V_3$ is then compared with the reference voltage $V_4$ in a differential amplifier $A_2$. An alternative manner for processing the voltages $V_1$ and $V_2$, occurring in the detection circuit of FIG. 1 is shown in FIG. 5.

The point at which the voltage $V_1$ ($V_2$) occurs is connected to the inverting input of a differential amplifier $A_3$ by way of a resistor $R_{13}$ ($R'_{13}$). The reference voltage $V_4$ which is derived from the supply battery by way of the resistors $R_{15}$ and $R_{16}$ is applied to the non-inverting input. The differential amplifier $A_3$ is fed back from the output to the inverting input by means of the resistor $R_{14}$. In a similar manner as described above, the resistors of the circuit of FIG. 5 can be dimensioned so that a signal $f(I_c)$ which is independent of the loop current $I_d$ is produced at the output of differential amplifier $A_3$.

What is claimed is:

1. A circuit arrangement for an automatic telephone exchange for detecting currents in a system of two conductors having earth as the common return conductor, comprising: a pair of terminals for said conductors, a supply battery and resistor, each one of said terminals being connected to different poles of said supply battery by way of said resistor and further comprising a first pair of resistors arranged in series between the one pole of said supply battery and the other terminal and a second pair of resistors arranged in series between the other pole of said supply battery and the one terminal, the junction of the resistors of said first pair and the junction of the resistors of said second pair constituting a pair of connecting points for the connection of a detector for detecting the differential-mode component of the currents in the two conductors, means for the detection of the common-mode component of the currents in the two conductors by forming the sum of the voltages at the said junctions of said first and second pair of resistors, respectively, and means for comparing said sum of the voltages with the potential at a point of reference potential, an indication of the common-mode component of the currents in the two conductors being derived from said last-mentioned means.

2. A circuit arrangement as claimed in claim 1, wherein said means for forming the sum of the voltages at the junctions of the first pair and the second pair of resistors, respectively, are constituted by a third pair of resistors arranged in series between the said junctions, the sum of the voltages being derived from the junctions of the resistors of the third pair.

3. A circuit arrangement as claimed in claim 1, wherein the point of reference potential is constituted by the junction of two resistors arranged in series between the two poles of the supply battery.

4. A circuit arrangement as claimed in claim 3, wherein a point to which a bias voltage is applied is connected to the point of reference potential by way of a resistor and to the junction of the third pair of resistors by way of a resistor.

5. A circuit arrangement as claimed in claim 3, wherein a point to which a bias voltage is applied is connected to the point of reference potential by way of a resistor and to the junction of the first pair of resistors by way of a resistor and to the junction of the second pair of resistors by way of a resistor.

* * * * *